United States Patent [19]
Herrmann

[11] 3,719,565
[45] March 6, 1973

[54] METHOD AND MEANS FOR MEASURING THE DEPOSITION RATE IN METALLIC PLATING BATHS

[75] Inventor: Gunther Herrmann, Fuerth, Germany

[73] Assignee: Photocircuits Division of Kollmorgen Corporation, Glen Cove, N.Y.

[22] Filed: Aug. 9, 1971

[21] Appl. No.: 170,001

[30] Foreign Application Priority Data

Aug. 10, 1970 Germany ............... P 20 39 634.3

[52] U.S. Cl. ............... 204/1 T, 204/195 R, 204/228, 324/29, 324/94
[51] Int. Cl. ............... G01n 27/00
[58] Field of Search ........... 204/1 T, 195 R, 228, 231; 324/29, 94

[56] References Cited

UNITED STATES PATENTS

| | | |
|---|---|---|
| 304,082 | 8/1884 | Edison ............... 324/94 |
| 408,112 | 7/1889 | Kookogey ............... 324/94 X |
| 3,481,838 | 12/1969 | Berryhill ............... 204/195 R X |
| 3,519,547 | 7/1970 | Paulik et al. ............... 204/1 T X |

Primary Examiner—G. L. Kaplan
Attorney—Michael S. Striker

[57] ABSTRACT

A method and arrangement for measuring the instantaneous deposition rate of material on work pieces within metallic plating baths. A test body is immersed in the plating bath and suspended from a weighing scale. A second comparator body is also suspended from the scale and immersed in a second comparator bath. Any increase in weight of the test body due to being plated is registered as an unbalance in the scale. The unbalance is converted into an electrical current which is used to plate the comparator body so that its weight becomes equal to the test body and the weighing scale is returned to a balanced state. The electrical current is measured and the current measurement is an indication of the instantaneous deposition rate.

9 Claims, 3 Drawing Figures

METHOD AND MEANS FOR MEASURING THE DEPOSITION RATE IN METALLIC PLATING BATHS

BACKGROUND OF THE INVENTION

The present invention relates to a method and arrangement for measuring the deposition rate in reduction and metallic plating baths.

The measurement of the deposition rate in the prior art has been accomplished with substantial accuracy in a discontinuous manner through the use of commercial apparatus for visually measuring the thickness. In such a method, heretofore, a particular measuring plate or a work piece is removed at the predetermined exposure time, and the deposited or plated layer during the exposure time, is determined, for example, coulometrically with the aid of the anodic removal. The ratio of the layer thickness to the exposure time gives the average deposition rate during the metallization. With this method, known in the art, the time intervals during which such deposition takes place, are of the order of 1 to 2 hours, in view of the equipment used, and therefore no information is obtained on the instantaneous conditions of the bath.

Accordingly it is an object of the present invention to provide a method for continuous measurement of the deposition rate in reduction and plating baths, with the maximum possible sensitivity.

For the purpose of achieving this object, the present invention provides a body with predetermined surface which is immersed in a metallic plating bath, and the metallic deposition is determined through a weighing scale. Through a corresponding second plating bath which serves as a comparator bath, a comparator body immersed in this second bath receives an identical amount of deposition for compensating any unbalance in the scale. This deposition on the comparator bath is accomplished through a plating current which is proportional to the deposition rate that takes place in the first bath.

Any unbalance between the body immersed within the first bath and the body in the second or comparator bath, can be converted to an electrical signal through the use of a light source cooperating with a light-control aperture attached to the scale. The light from the light source is directed onto a photoresistor which in turn converts the light into an electrical signal.

The arrangement of the present invention has as its feature, that a measuring plate of predetermined surface is immersed within the metallic plating bath that the work pieces are immersed. A scale is provided for detecting as an unbalance any increase in weight of the measuring plate, as a result of deposition that takes place. The scale also is provided with a second or comparator body immersed within a comparator bath, and a plating current which is proportional to the deposition rate in the first bath serves to plate the comparator body so that the scale is continuously balanced.

SUMMARY OF THE INVENTION

It is an object of the present invention to provide a method and means for measuring the deposition rate of a body while it is being plated in a metallic plating bath.

It is also an object of the present invention to provide for continuous measurement of the deposition rate while plating a metallic body.

It is furthermore an object of the present invention to provide a method and means for measuring and indicating the instantaneous deposition rate in plating a metallic body with a predetermined metallic material.

In accordance with the invention, the method consists of immersing a metallic test body in the plating bath in which the work pieces are immersed as well. The test body is suspended from a weighing scale, and any increase in weight of the test body due to being plated, is registered as an unbalance of the scale. Also suspended from the weighing scale is another comparator body which is, in turn, immersed within a second bath. Any unbalance in the scale is used to generate an electrical current which serves to plate the comparator body in the second bath so that the comparator body weighs as much as the best body and the scale is returned to a balanced state. The current is measured with a current meter, and the magnitude of the current is used as an indication of the instantaneous deposition rate. The current is generated through an electro-optical arrangement consisting of a light source and a photosensitive resistor.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
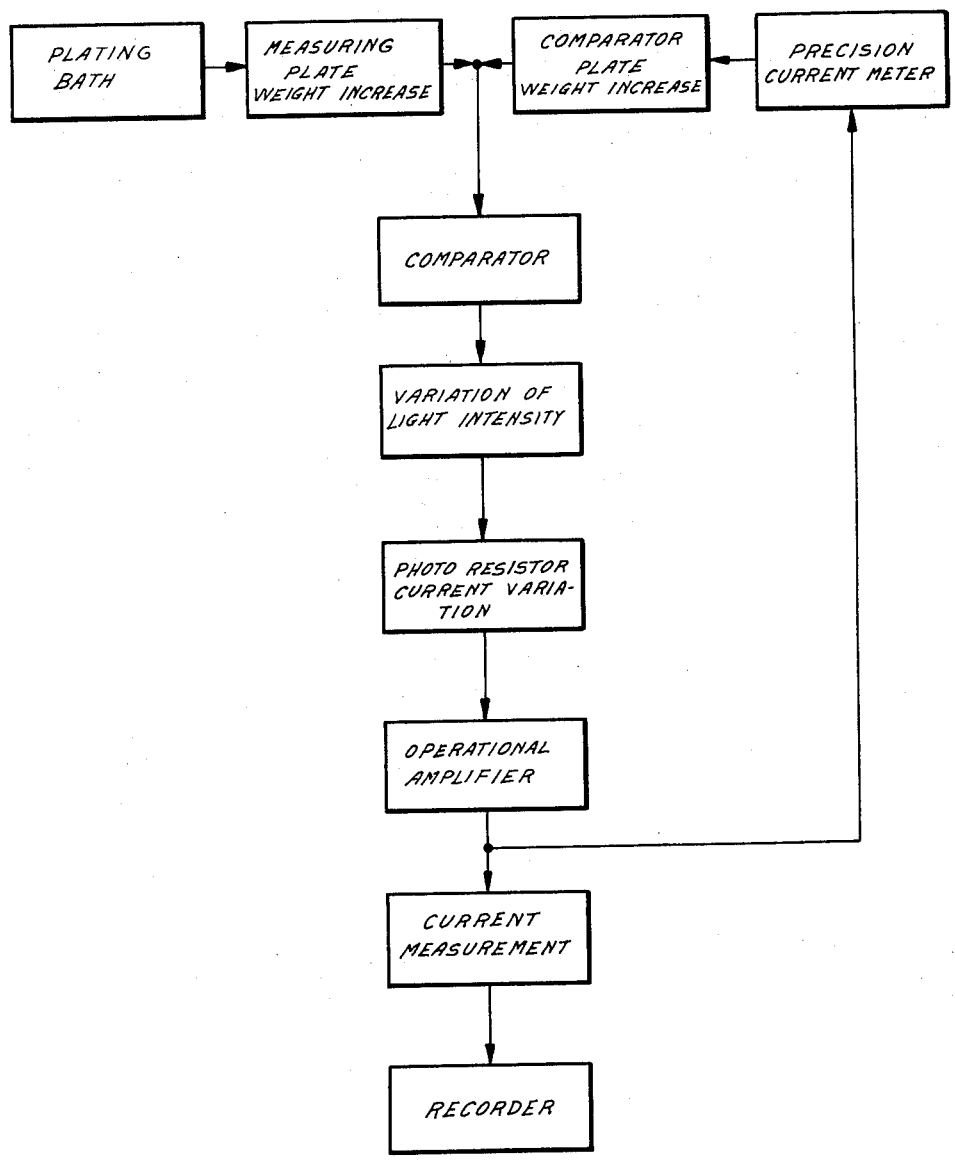
FIG. 1 is a block diagram of the method in accordance with the present invention.
Figure 2:
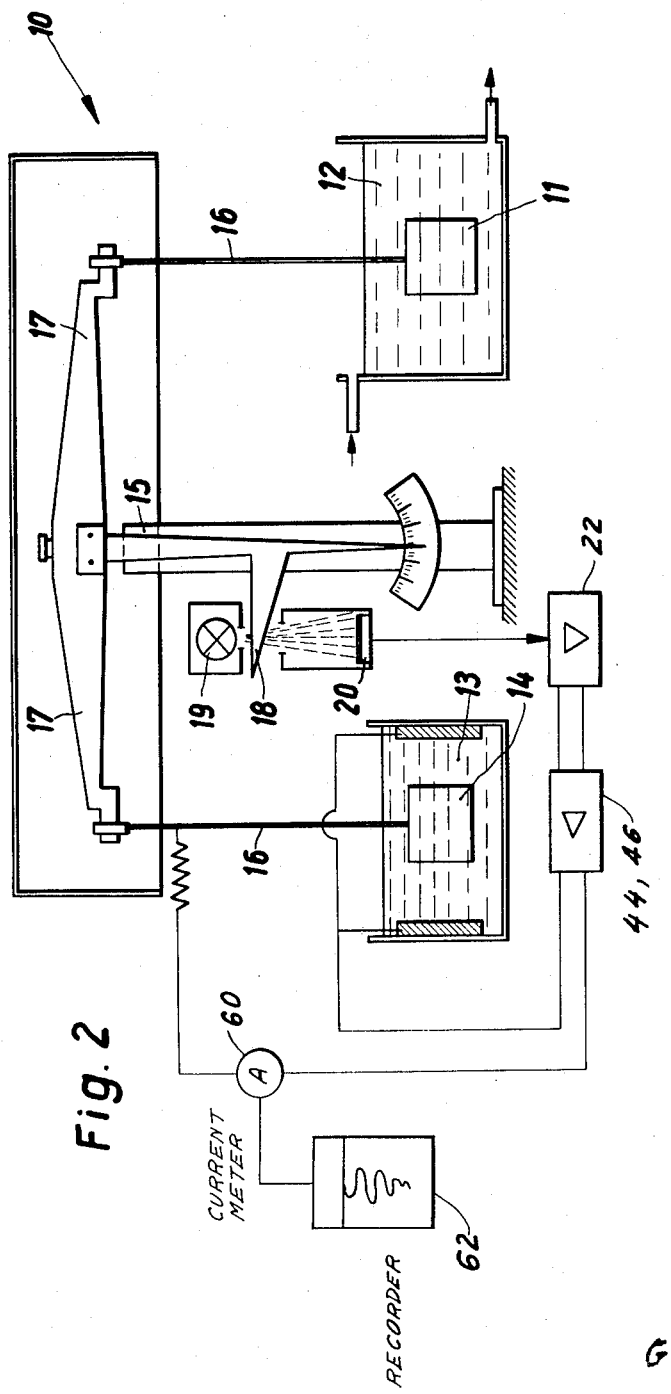
FIG. 2 is a functional schematic diagram and shows the arrangement for carrying out the method of the present invention.

In practicing the method of the present invention illustrated in the drawing, a measuring plate 11 is immersed in a metallic plating bath 12. This measuring plate 11 is immersed under the identical conditions as are the work pieces. Accordingly, the measuring plate 11 is subjected to precisely the same deposition processes that take place on the work pieces. Thus, the metallic plate 11 is subjected to substantially the identical qualitatively and quantitatively conditions as are the work pieces, with substantial precision. A comparing plate 14 is provided within a second bath 13. The two plates 11 and 14 are suspended from opposite weighing arms of a balancing scale. Through suspension wires 16, these plates 11 and 14 are suspended from the arms 17 of the scale. A sensitive indicator 15 is provided in conjunction therewith on the balancing scale.

At the beginning of the measuring process, the weighing scale with indicator 15 is brought into balance. As soon as a deposition takes place on the measuring plate 11, the weight of this plate is increased. Accordingly, the balance of the scale is disturbed, and the balancing beam with arms 17 becomes inclined so that the end of the arm 17 suspending the plate 11 drops downward.

Attached to the indicating mechanism 15, is a wedge-shaped portion 18 which projects within the light path of light emitted by a source 19. The light emitted by this source 19 is directed upon a photo-sensitive resistor 20. When the scale becomes unbalanced as a result of deposition taking place on plate 11, as described above, the amount of light impinging upon the photoresistor 20 from the source 19, is reduced, as a result of the positioning of the element 18.

Figure 3:
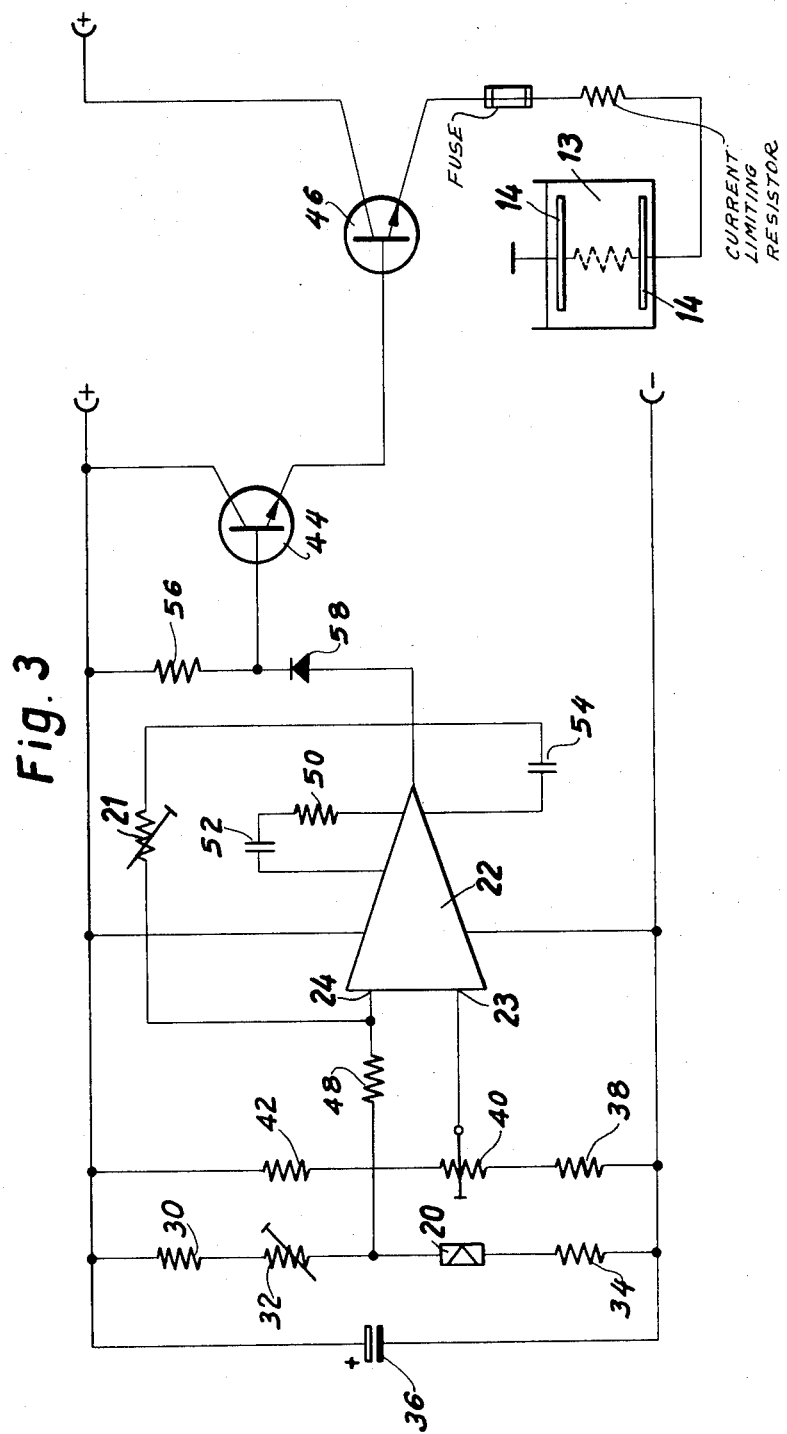
FIg. 3 is an electrical circuit diagram and shows the manner in which the regulating current for determining the deposition rate in plating of work pieces in baths is determined.

The photoresistor 20 is connected in series with a plurality of resistors 30,32,34 which serve as a voltage divider. A voltage source 36 is connected across this voltage divider. The voltage source 36 is maintained at constant potential such as is available from a battery, for example. This circuitry is illustrated in FIG. 3.

When, now, the amount of light impinging upon the photoresistor 20 is reduced as a result of unbalancing of the weighing scale, the resistance of the photoresistor 20 becomes changed independency of the light intensity impinging on the resistor. As a result of the change in the internal resistance of this photosensitive component, the voltage across the photoresistor 20 is changed correspondingly because it is within the voltage divider. This varying voltage across the photoresistor 20 is applied to an input 24 of an operational amplifier 22. A feedback resistor 21 serves to determine the amplification factor of this amplifier 22.

The other input 23 of the amplifier 22 is connected to a second voltage divider composed of the series combination of resistors 38,40, and 42. The resistor 40 is of the variable component type, and the voltage applied to the input 23 of the amplifier 22 is adjusted through the variable resistor 40, so that the operating point of the amplifier lies within the non-saturated region of this amplifier. The amplification factor of this amplifier may be continuously adjusted within the region of 1 to 40,000. The output of the amplifier 22 is applied to an emitter follower 44. The signal from the emitter follower 44 is then applied to a power transistor 46 which provides the necessary current to the plating bath 13, in order to maintain the weighing scale balanced. Resistors 48,50 and capacitors 52 and 54 serve the purpose of trimming the amplifier 22 and adjusting its output signal within the desired operating region. Resistor 56 and diode 58 connected in series to the output of the amplifier 22, serve to apply the output signal of this amplifier to the emitter follower 44.

The increase in weight of the measuring plate 11 per unit of time, must be equal to the increase in weight of the comparator plate 14 per unit of time, in order to maintain the weighing scale balanced, with its indicator 15 in the balanced position. At the same time, the deposition rate which is equal to the amount of material deposited per unit of time, is proportional to the magnitude of the current. Consequently, the deposition rate in the first plating bath 12, is proportional to the plating current in the second bath 13. By measuring the plating current in the comparator bath 13, it is possible to obtain a reliable instantaneous indication of the deposition rate that takes place in the first plating bath 12.

With the arrangement of the present invention, the metallic deposition rate may be measured in a very simple manner and in a continuous fashion. The plating or deposition rate is dependent essentially upon the following factors:

1. the type of bath components used;
2. the concentration of the individual components on a relative as well as on an absolute basis;
3. bath auxiliary equipment of different types as, for example, stabilizers, accelerators, wetting agents, catalysts, synthesis agents, etc.;
4. the type of catalysated surfaces;
5. the ratio of bath volume to the plating surface;
6. bath temperature;
7. type and frequency of bath movements;
8. density and pressure of the bath; and
9. contamination with foreign ingredients (particularly inhibitors).

An deviations in the parameters that were set or adjusted in the bath installation, can be immediately detected with the arrangement of the present invention. Any such deviations, therefore, can be then immediately corrected. Such detection and correction of operating parameter deviations, was not heretofore possible.

In accordance with the present invention, a current meter 60 connected to the amplifier 22 is used to measure the current and thereby obtain an indication of the instantaneous deposition rate within the plating bath 12. This current from the amplifier 22 may also then be applied to a recorder 62 to furnish a permanent indication, for example, of the instantaneous deposition rate as the plating progresses over time.

In carrying out the invention according to a practical method, the comparator bath 13 can contain a 10 percent silver nitrate solution. The cathode of this comparator bath 13 can be in the form of a silver electrode or a platinum electrode.

It will be understood that each of the elements described above, or two or more together, may also find a useful application in other types of constructions differing from the types described above.

While the invention has been illustrated and described as embodied in deposition rate measurements, it is not intended to be limited to the details shown, since various modifications, structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. A method for measuring the deposition rate in a plating bath comprising the steps of: immersing a metallic test body with predetermined surface in said plating bath; weighing said test body; plating said test body in said bath with a metallic plating material; generating an electrical current proportional to the weight of said material plated onto said test body; applying said electrical current to plate a comparator metallic body immersed in another bath with said material so that the increase in weight of said comparator body is equal to the weight of said material plated onto said test body; and measuring said current whereby said current is proportional to the deposition rate of said material onto said test body.

2. A method as defined in claim 1, wherein said electrical current is varied as a function of parameters operative during said weighing step.

3. An arrangement for carrying out the method of measuring the deposition rate of a plating bath comprising, in combination, a vessel for a plating bath for plating work pieces therein; a weighing scale; a test body adapted to be immersed in said bath and suspended from said weighing scale; a comparator bath with comparator body suspended from said weighing scale so that said comparator body is immersed in said comparator bath, said weighing scale comparing the weights of said test body and said comparator body; current generating means connected to said weighing scale and generating a current as a function of any unbalance of said scale; and means for applying said current to said comparator to plate said comparator body so that said scale is maintained balanced; and means to measure said current, whereby said current is proportional to the deposition rate during plating said test body.

4. An arrangement as defined in claim 3, wherein said current generating means comprises a source of light; a photosensitive resistor in the path of light from said source so that said light from said source impinges upon said resistor; means in the path of said light for varying the amount of light impinging upon said photoresistor as a function of any unbalance of said measuring scale; and current amplifying means connected to said photoresistor and amplifying the variation in current through said resistor.

5. An arrangement as defined in claim 4, wherein said amplifying means comprises an operational amplifier.

6. An arrangement as defined in claim 5 including power amplifying means connected to the output of said operational amplifier for amplifying said current from said operational amplifier and applying said current for plating said comparator body.

7. An arrangement as defined in claim 3, wherein said comparator bath has a ten percent silver nitrate solution.

8. An arrangement as defined in claim 3, wherein the cathode of said comparator bath is a silver electrode.

9. An arrangement as defined in claim 3, wherein the cathode of said comparator bath comprises a platinum electrode.

* * * * *